(12) United States Patent
Okazaki et al.

(10) Patent No.: US 8,194,323 B2
(45) Date of Patent: Jun. 5, 2012

(54) METHOD FOR PRODUCING WAFER LENS ASSEMBLY AND METHOD FOR PRODUCING WAFER LENS

(75) Inventors: Naoko Okazaki, Tokyo (JP); Shigeru Hosoe, Hachioji (JP); Masashi Saito, Koganei (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/682,460

(22) PCT Filed: Apr. 8, 2009

(86) PCT No.: PCT/JP2009/057185
§ 371 (c)(1),
(2), (4) Date: Apr. 9, 2010

(87) PCT Pub. No.: WO2009/133756
PCT Pub. Date: Nov. 5, 2009

(65) Prior Publication Data
US 2010/0208354 A1 Aug. 19, 2010

(30) Foreign Application Priority Data

Apr. 28, 2008 (JP) ................. 2008-116639
Apr. 28, 2008 (JP) ................. 2008-116645
Apr. 28, 2008 (JP) ................. 2008-116654
Apr. 28, 2008 (JP) ................. 2008-116663
Apr. 28, 2008 (JP) ................. 2008-116669

(51) Int. Cl.
*G02B 27/10* (2006.01)

(52) U.S. Cl. ...................... 359/622; 359/619

(58) Field of Classification Search .............. 359/622
See application file for complete search history.

(56) References Cited

U.S. PATENT DOCUMENTS 5,648,874 A  7/1997  Sawaki et al.
6,324,010 B1  11/2001  Bowen et al.
(Continued)

FOREIGN PATENT DOCUMENTS

JP  5 027104  2/1993
(Continued)

OTHER PUBLICATIONS

European Partial Search Report Issued Jan. 26, 2012 in EP 09 73 8693.

(Continued)

*Primary Examiner* — James Jones
(74) *Attorney, Agent, or Firm* — Cozen O'Connor

(57) ABSTRACT

There is provided a method for producing a wafer lens assembly capable of adhering a wafer lens and a spacer surely. The wafer lens assembly includes a first substrate including plural optical members formed of a curable resin on at least one surface, a second substrate joined to the first substrate, and a stop member arranged between the first and second substrates. The first and second substrates are adhered with an adhesive made of a photo-curable resin. The method includes an adhesive applying step of applying the adhesive made of a photo-curable resin on a joining area, a stop-member forming step, and a photo-curing step of irradiating and hardening the adhesive applied in the adhesive applying step with light after the stop-member forming step. The stop member is formed so as not to prevent the light irradiated in the photo-curing step from reaching the adhesive.

5 Claims, 13 Drawing Sheets

U.S. PATENT DOCUMENTS

| | | |
|---|---|---|
| 7,342,731 B2 | 3/2008 | Lee et al. |
| 7,703,997 B2 | 4/2010 | Lee et al. |
| 2002/0027715 A1* | 3/2002 | Shimizu et al. ............... 359/619 |
| 2002/0080323 A1 | 6/2002 | Muroya |
| 2006/0215269 A1* | 9/2006 | Abe et al. ...................... 359/619 |
| 2008/0123199 A1 | 5/2008 | Hong |
| 2009/0279188 A1 | 11/2009 | Do |

FOREIGN PATENT DOCUMENTS

| | | |
|---|---|---|
| JP | 2000-131508 | 5/2000 |
| JP | 2006-323365 | 11/2006 |
| JP | 3926380 | 6/2007 |
| JP | 2007-195167 | 8/2007 |
| JP | 2008-129606 | 6/2008 |
| JP | 2009-301061 | 12/2009 |
| JP | 4387368 | 12/2009 |
| JP | 4466789 | 5/2010 |

OTHER PUBLICATIONS

Ming-Hsien Wu et al: "Fabrication of Two-Dimensional Arrays of Microlenses and Their Applications in Photolithography; Fabrication of Two-Dimensional Arrays of Microlenses and Their Applications in Photolithography," Journal of Micromechanics and Microengineering, Institute of Physics Publishing, Bristol, GB, vol. 12, No. 6 2002.

* cited by examiner

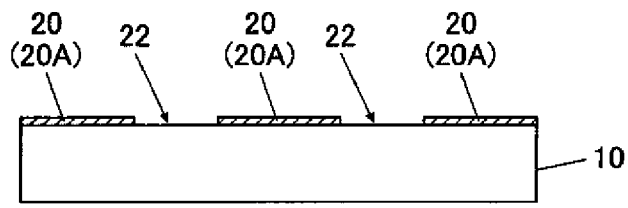
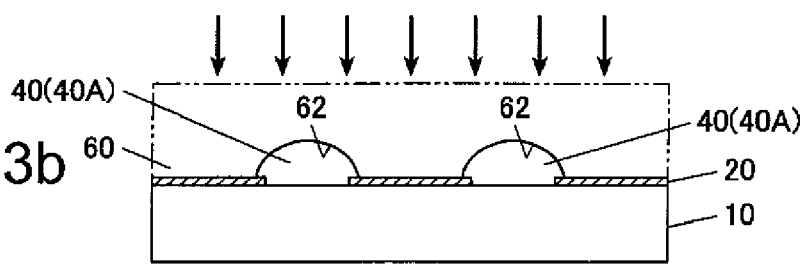
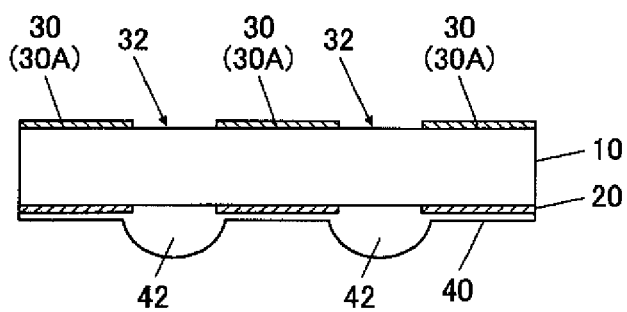
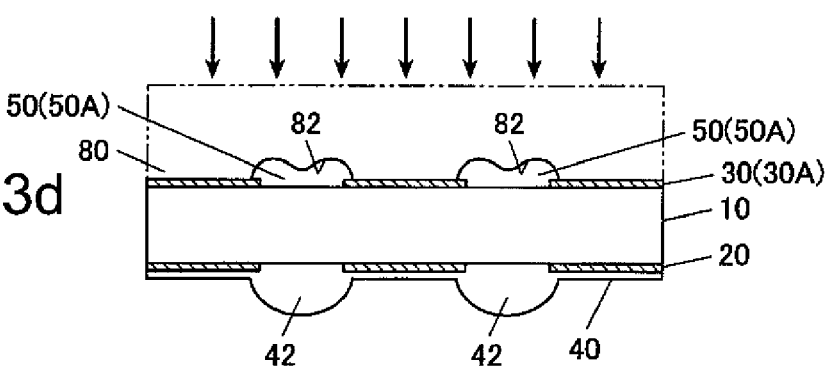
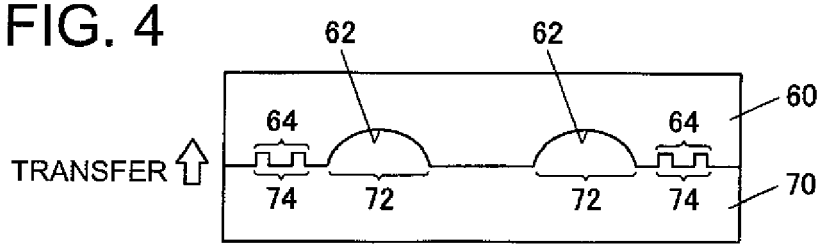

FIG. 6
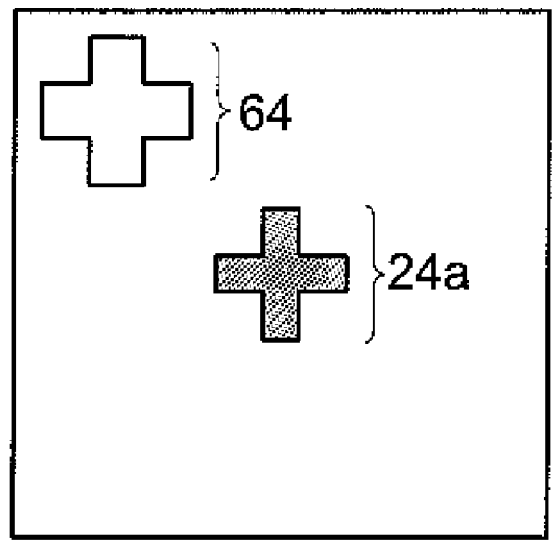
⇩ ALIGNMENT
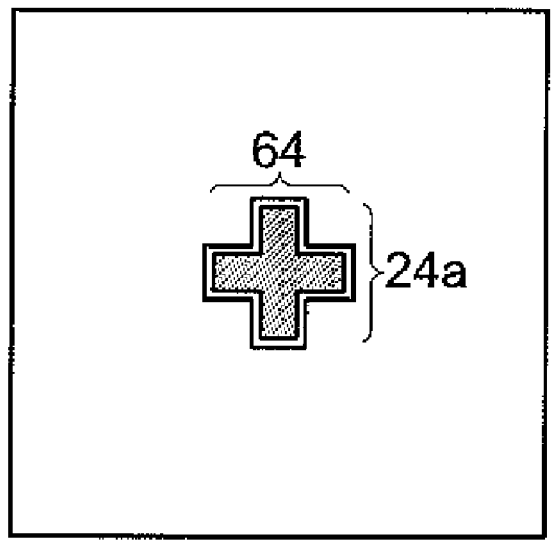

METHOD FOR PRODUCING WAFER LENS ASSEMBLY AND METHOD FOR PRODUCING WAFER LENS

RELATED APPLICATIONS

This is a U.S. National Phase Application under 35 U.S.C. 371 of International Application PCT/JP2009/057185, filed on Apr. 8, 2009.

This application claims the priority of Japanese Application Nos. 2008-116639 filed on Apr. 28, 2008, 2008-116645 filed Apr. 28, 2008, 2008-116654 filed Apr. 28, 2008, 2008-116663 filed Apr. 28, 2008 and 2008-116669 filed Apr. 28, 2008, the entire content of all of which is hereby incorporated by reference.

TECHNICAL FIELD

The present invention relates to a method for producing a wafer lens assembly and a method for producing a wafer lens.

TECHNICAL FIELD

In a field of producing optical lenses, there has conventionally been studied a technology to obtain an optical lens with high heat resistance by providing a lens section (an optical member) that is made of curable resin such as thermosetting resin on a glass plate (for example, see Patent Literature 1).

Further, as a method for producing an optical lens to which the present technology is applied, the following method has been developed. A stop which is formed of a metal film and is provided for adjusting an amount of incident light, is formed on a glass plate, and a plurality of optical members which are made of curable resin are formed on the stop, to form so-called a "wafer lens". Then, as plural lenses are united together, the wafer lenses are layered and adhered to form a plurality of unified lenses, where there is provided a spacer inserted into the wafer lenses or a projection section which is formed simultaneously with an optical surface and is placed to come in contact with the wafer lenses. After that, a glass plate section is cut to produce the optical lenses. According to the producing method, producing cost of optical lenses can be reduced.

CITATION LIST

Patent Literature

Patent literature 1: JP-B No. 3926380

SUMMARY OF INVENTION

Technical Problem

Incidentally, when a wafer lens assembly is produced by layering a plurality of wafer lenses, it is necessary to prepare a spacer which supports upper and lower wafer lenses and adjusts arrangement positions of optical members located upward and downward, and to interpose the spacer in the glass plates. At that time, the spacer needs to be adhered on the surface of the stop with adhesive made of photo-curable resin. However, there has been a problem that a spacer cannot be adhered on the surface of the stop, because the stop is usually composed of a metal film that does not transmit light used for curing adhesive (Though the glass plate is used in this description, the situations are the same even in the case of a plastic plate or of a flat plate made of transparent ceramic. Thus, hereafter, with respect to the description of the glass flat plate, a material of the flat plate is not limited to glass, and it also means other transparent flat plate made of material such as plastic or ceramic, without limiting a scope of rights of the present invention).

The foregoing is the same as an occasion wherein one substrate forming a wafer lens, is joined to another substrate in another wafer lens on which a member for adjusting an interval to the above wafer lens has been formed in advance.

The present invention has been achieved in view of the aforesaid circumstances, and one of objects is to provide a method for producing a wafer lens assembly in which a wafer lens and another substrate such as a spacer can be adhered surely and to provide a method for producing a wafer lens.

Solution to Problem

The above problem is solved by providing a method for producing a wafer lens assembly as follows. The wafer lens assembly includes a first substrate including a front surface and a back surface, wherein at least one of the front surface and the back surface includes a plurality of optical members made of a curable resin. The wafer lens assembly further includes a second substrate joined to the front surface or the back surface of the first substrate; and a stop member arranged between the first substrate and the second substrate, for controlling an amount of light entering the optical members. In the wafer lens assembly, the first substrate and the second substrate are joined together through an adhesive made of a photo-curable resin. The method comprises: an adhesive applying step of applying an adhesive made of a photo-curable resin on a joining area of the first substrate to be joined to the second substrate or a joining area of the second substrate to be joined to the first substrate. The method further comprises a step of forming a stop member at a position between the first substrate and the second substrate; and a photo-curing step of hardening the adhesive which has been applied in the adhesive applying step, by irradiating and hardening the adhesive with light after the step of forming the stop member. In the method, the stop member is formed at a position where the stop member does not prevent the light irradiated in the photo-curing step from reaching the adhesive.

The above problem is also solved by providing a method for producing a wafer lens as follows. The wafer lens includes a substrate including a front surface and a back surface. The wafer lens further includes a plurality of first optical members formed of a curable resin, on one surface of the front surface and the back surface; and a plurality of second optical members formed of a curable resin, on the other surface of the front surface and the back surface. The wafer lens further includes stop members arranged on the respective plurality of first optical members or the respective plurality of second optical members on the front surface or the back surface of the substrate. The method comprises: a step of forming an alignment mark on the one surface of the substrate; and a step of forming the first optical members by filling an area between a first mold and the substrate with the curable resin and by hardening the curable resin, under a condition that the first mold including molding surfaces for the first optical members is positioned with respect to the alignment mark; and a step of forming stop members on the front surface or the back surface of the substrate. The method further comprises a step of forming the second optical members by filling an area between a second mold and the substrate with the curable resin and by hardening the curable resin, under a condition that the second mold including molding surfaces for the second optical members is positioned with respect to the alignment mark. In the method, the stop members formed in the step of forming the stop members are formed at a position where the stop members do not prevent positioning of the first or second mold with respect to the alignment mark.

The above problem is also solved by providing a method for producing a wafer-lens assembly as follows. In the wafer lens assembly, wafer lenses are vertically layered through a spacer. Each of the wafer lenses includes a substrate, a stop member formed on one surface of the substrate, and an optical member formed of a curable resin on a surface of the stop member. The method comprises a step of adhering the spacer and one of the wafer lenses by applying an adhesive made of a photo-curable resin on an area between one surface of the one of the wafer lenses and one surface of the spacer, and irradiating the adhesive with light. The method further comprises a step of placing the other surface of the spacer on an area excluding the stop member and located in a surface of the other wafer lens facing the one of the wafer lenses, without forming the stop member on a position, which corresponds to the other surface of the spacer, in the other wafer lens. The method further comprises a step of adhering the spacer and the other wafer lens together by applying the adhesive on an area between the other surface of the spacer and the area of the other wafer lens excluding the spacer, and by irradiating the adhesive with light.

The above problem is also solved by providing a method for producing a wafer lens as follows. The wafer lens includes a substrate, a first stop member formed on one surface of the substrate, a first optical member formed of a curable resin on a surface of the first stop member, a second stop member formed on the other surface of the substrate, and a second optical member formed of a curable resin on a surface of the second stop member. The method comprises the steps of: forming a plurality of alignment marks and the first stop member on the one surface of the substrate, then, forming the first optical member by filling an area between a surface of the first stop member and a first mold with the curable resin and by hardening the curable resin, under a condition that the first mold including a molding surface for the first optical member is positioned with respect to a predetermined alignment mark among the plurality of alignment marks, then, forming the second stop member under a condition that a mask is positioned with respect to a predetermined alignment mark among the plurality of alignment marks, on the other surface of the substrate, then, forming the second optical member by filling an area between a surface of the second stop member and a second master mold with the curable resin and by hardening the curable resin, under a condition that the second mold including a molding surface for the second optical member is positioned with respect to a predetermined alignment mark in the plurality of alignment marks.

The substrate described in this description, is not limited to a glass substrate. The substrate can be a plastic substrate made of thermosetting or thermoplastic resin, and can be a substrate made of transparent ceramic. The scope of the invention is not limited by these materials for the substrate.

Advantageous Effects of Invention

According the present invention, a stop is not formed at a joining position which is located within the other wafer lens and is joined to the other substrate which is to be joined to the other wafer lens (when the other substrate is a spacer, the joining position is a position which corresponds to the other surface of the spacer). Therefore, light for curing directly enters adhesive, and a wafer lens and the other substrate such as a spacer can be surely adhered together.

Further, when optical members are formed on both sides of the glass plate, the optical members on the both surfaces and the stop can be piled in the vertical plane with being displaced from each other (shift error). Therefore, as the greater number of members are piled up, the more accumulation of the errors is produced, which makes difficulty in aligning the optical members and the stop arranged on the both surfaces along the optical axis with high accuracy. However, when a predetermined alignment mark is formed on one surface of the substrate and each of the first optical member and the second optical member is positioned and formed on the basis of the predetermined alignment mark as a reference, those can be aligned along the optical axis with high accuracy. It is highly advantageous when optical members and a spacer are formed on opposing surfaces of the substrate especially, in the way that they can be aligned along the optical axis with high accuracy.

Each of FIGS. 3a to 3d is a diagram for schematically illustrating a method of producing a wafer lens relating to the preferred embodiment (first embodiment) of the present invention.

FIG. 4 is a diagram for illustrating a method of producing a master.

Figure 5:
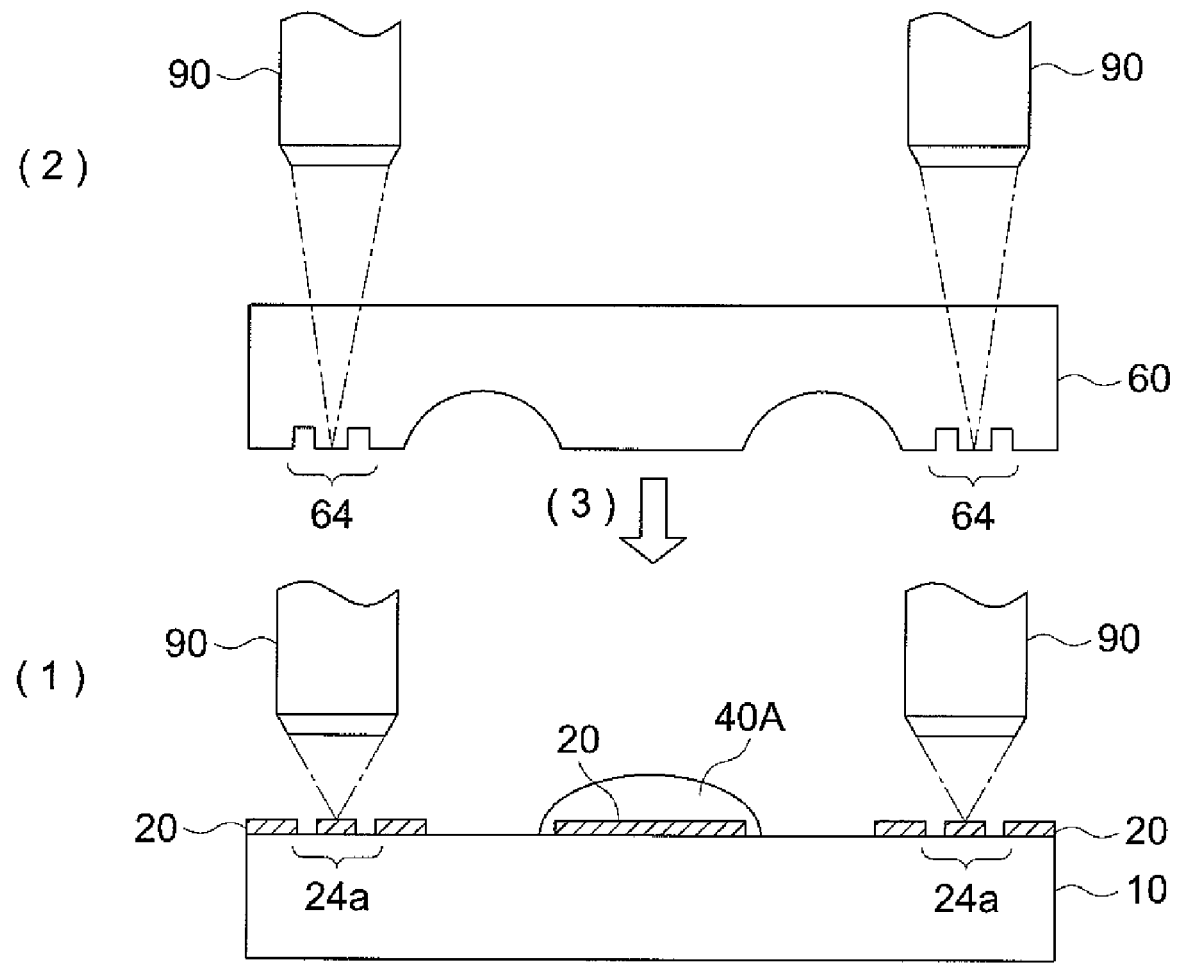

FIG. 5 is a diagram for illustrating positioning of an alignment mark of the stop and a master.

FIG. 6 is a diagram for illustrating positioning of an alignment mark of the stop and a master.

Figure 7:
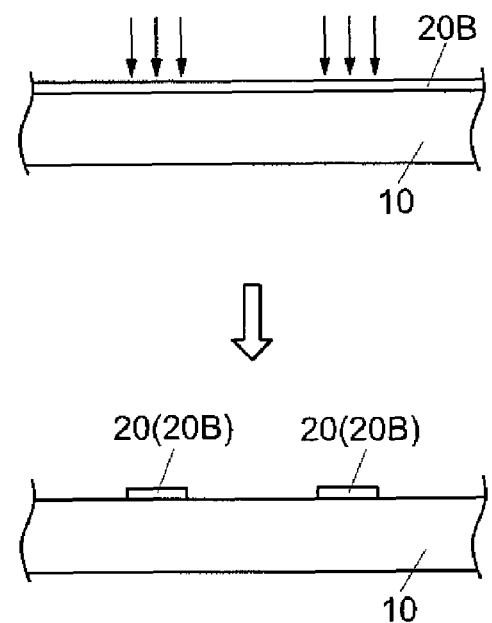

FIG. 7 is a diagram for illustrating a modified example of the stop structure and its method of producing.

Figure 8:
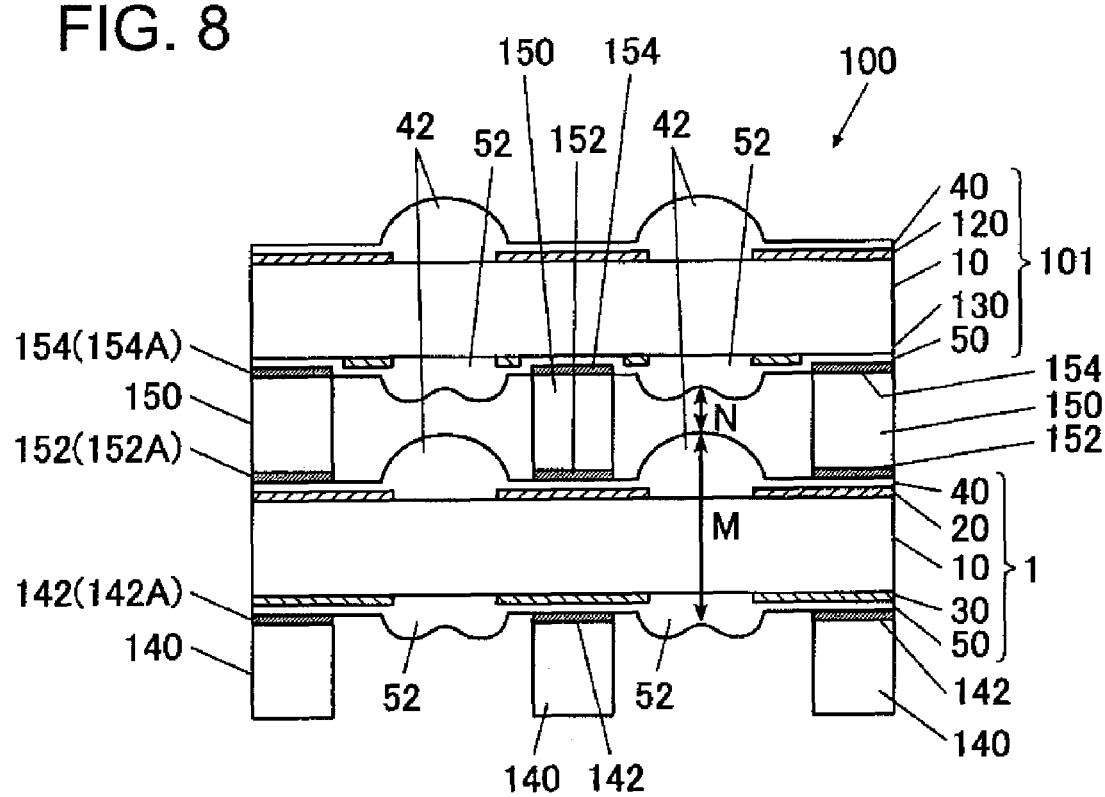

FIG. 8 is a schematic and sectional view of a wafer lens assembly relating to the preferred embodiment (second embodiment) of the present invention.

Figure 9:
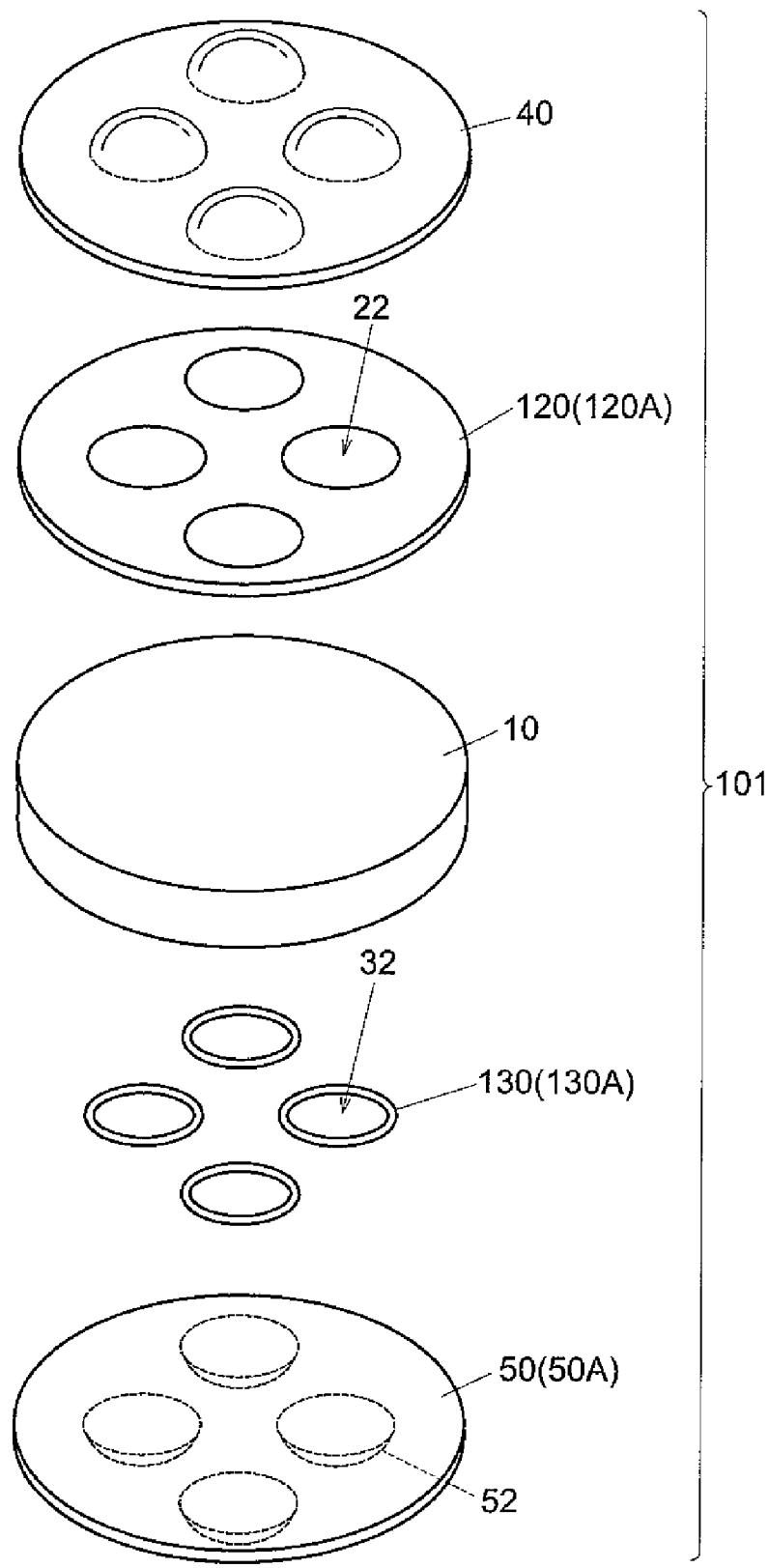

FIG. 9 is a schematic and exploded perspective view of a wafer lens relating to the preferred embodiment (second embodiment) of the present invention.

Figure 10A:
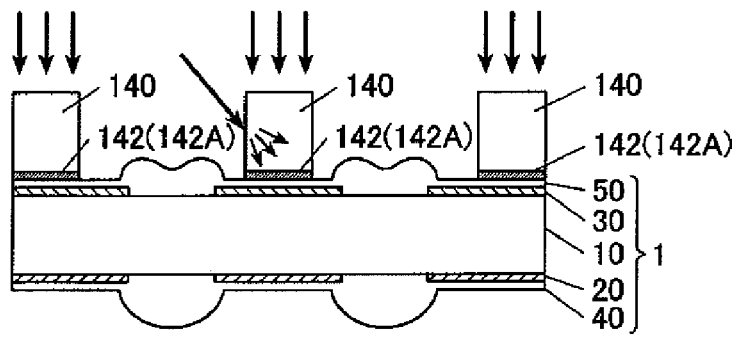
Figure 10B:
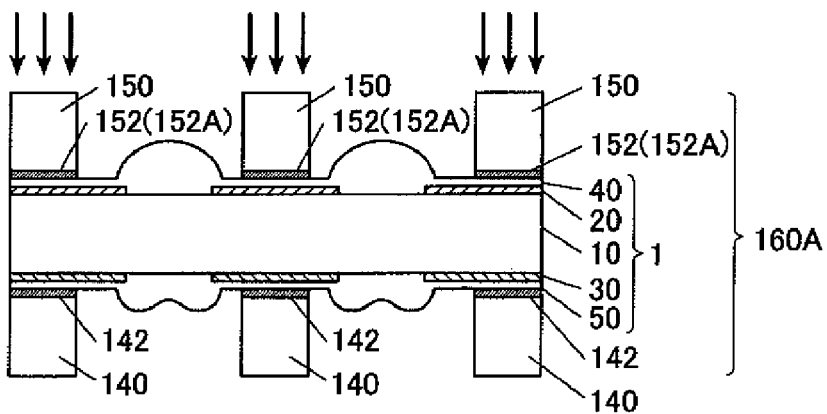

Each of FIGS. 10a and 10b is a diagram for schematically illustrating a method of producing a wafer lens assembly relating to the preferred embodiment (second embodiment) of the present invention.

Figure 11A:
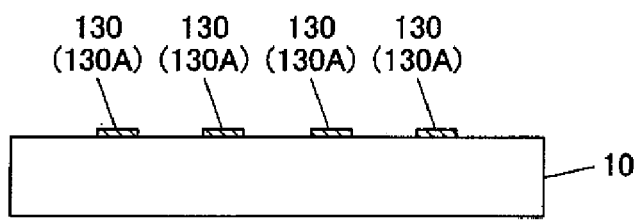
Figure 11B:
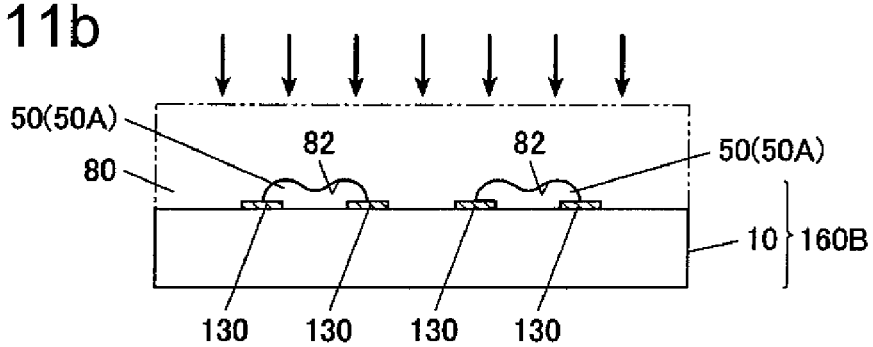

Each of FIGS. 11a and 11b is a diagram for schematically illustrating a method of producing for a wafer lens relating to the preferred embodiment (second embodiment) of the present invention.

Figure 12A:
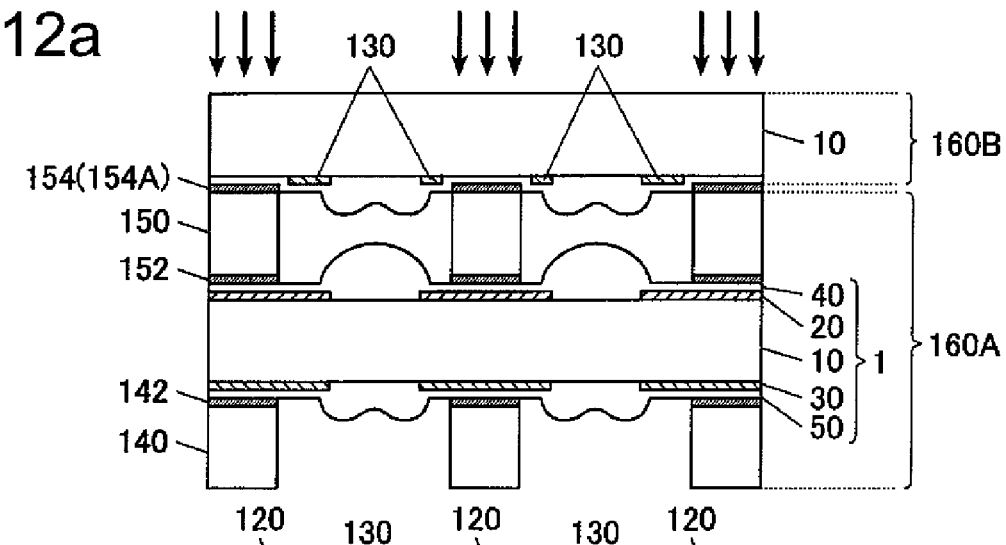
Figure 12B:
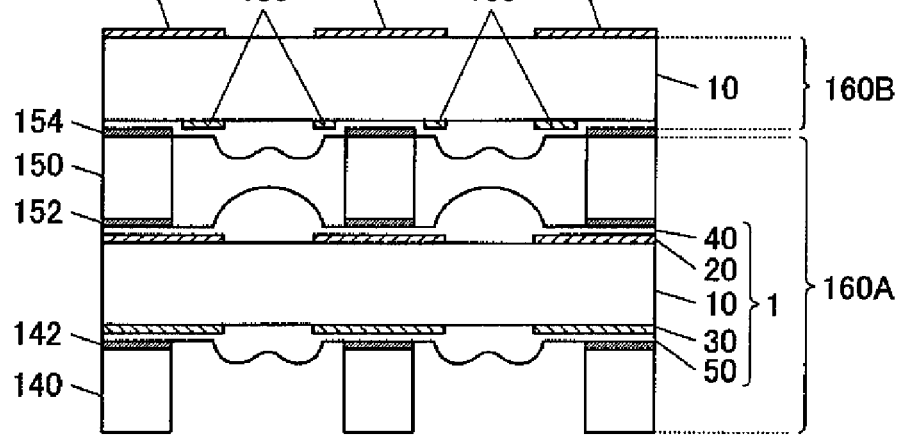
Figure 12C:
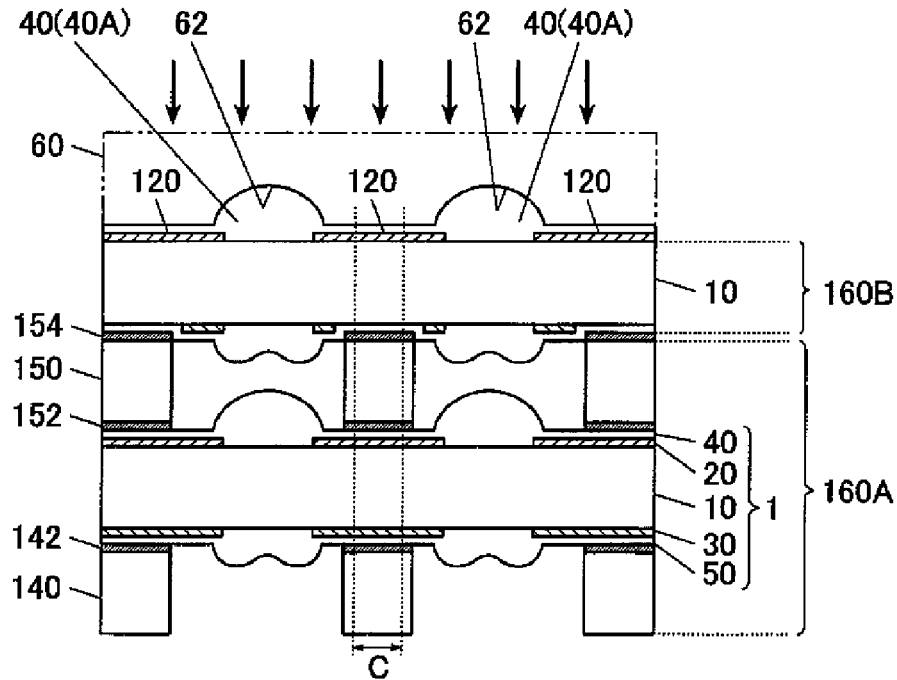

Each of FIGS. 12a to 12c is a diagram for schematically illustrating steps succeeding to FIGS. 10a and 10b.

Figure 13:
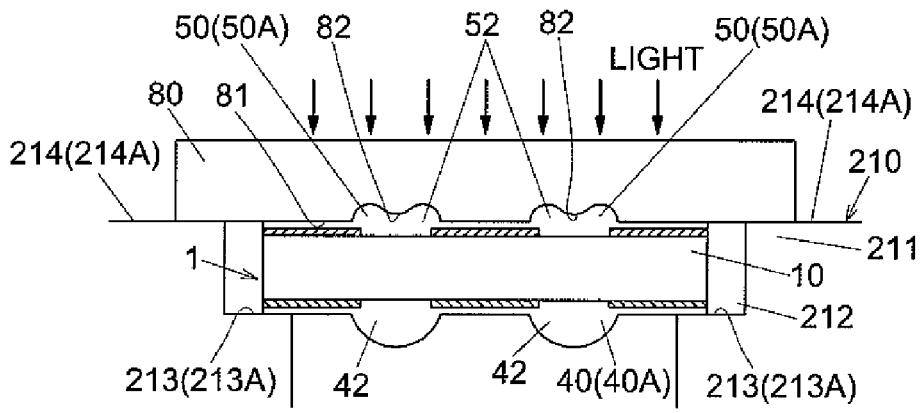

FIG. 13 is a diagram for schematically illustrating a method of producing a wafer lens relating to the preferred embodiment (third embodiment) of the present invention.

Figure 14:
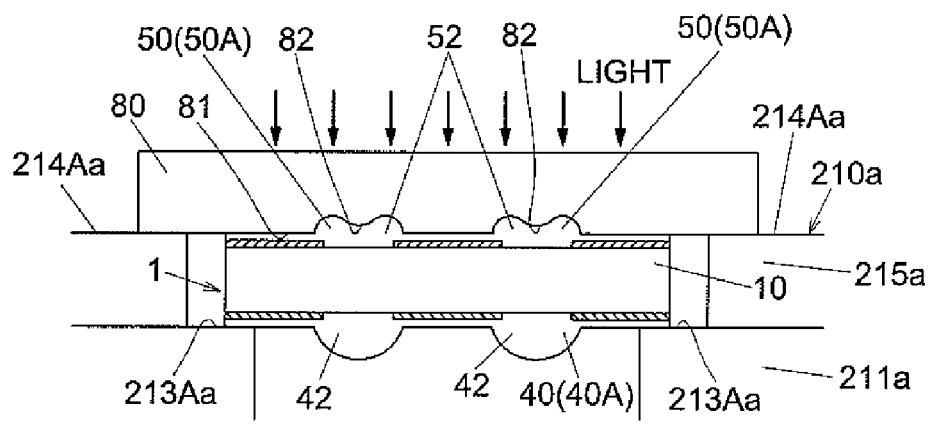

FIG. 14 is a diagram for illustrating a modified example of FIG. 13.

Figure 15:
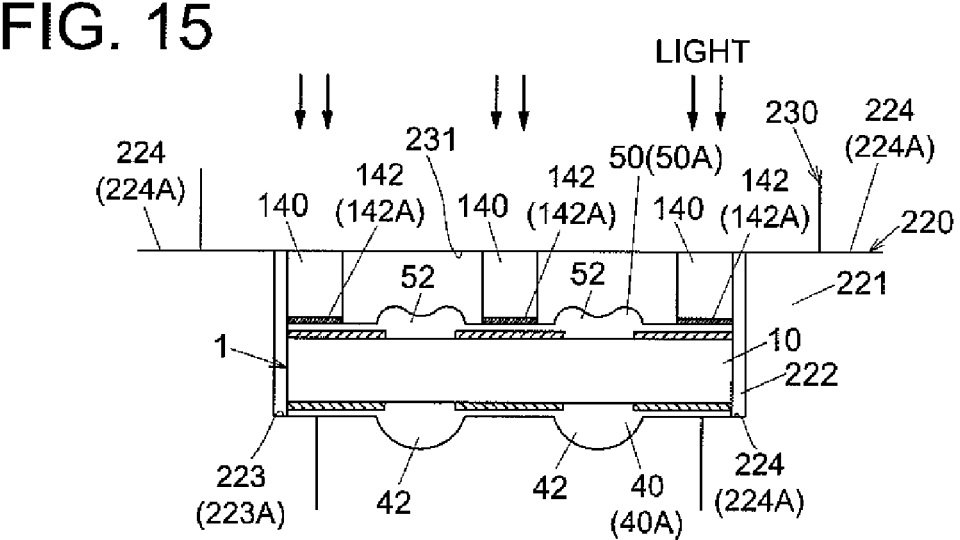

FIG. 15 is a diagram for schematically illustrating a method of producing a wafer lens assembly relating to the preferred embodiment (third embodiment) of the present invention.

Figure 16:
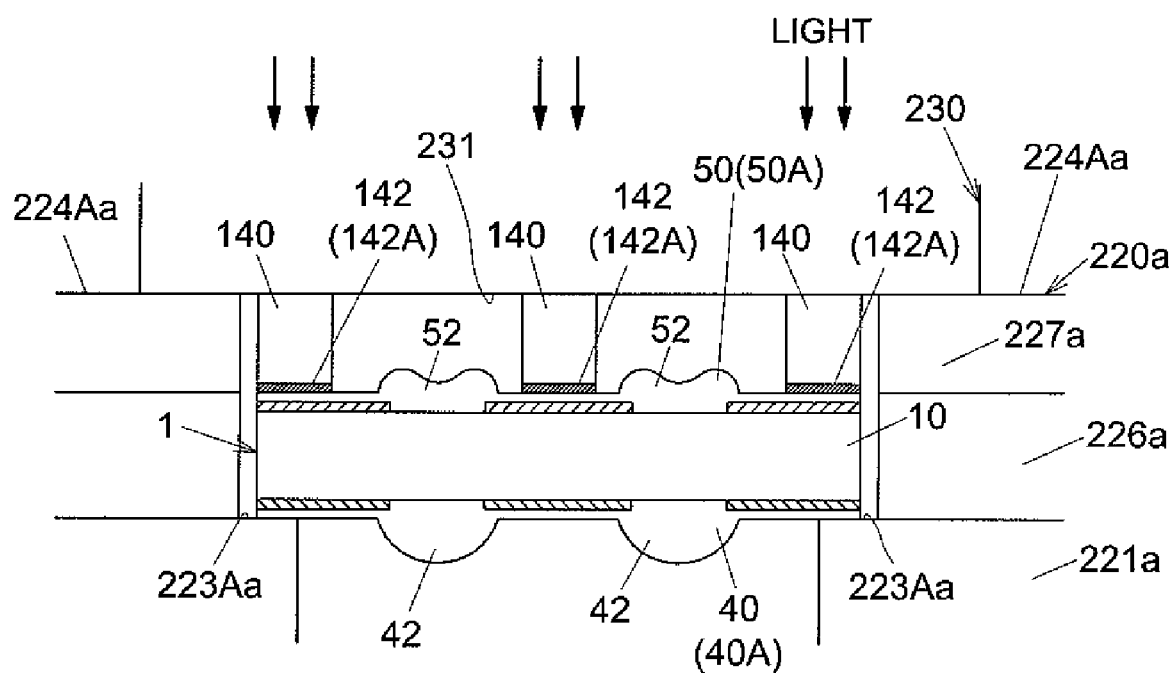

FIG. 16 is a diagram for illustrating a modified example of FIG. 15.

Figure 17A:
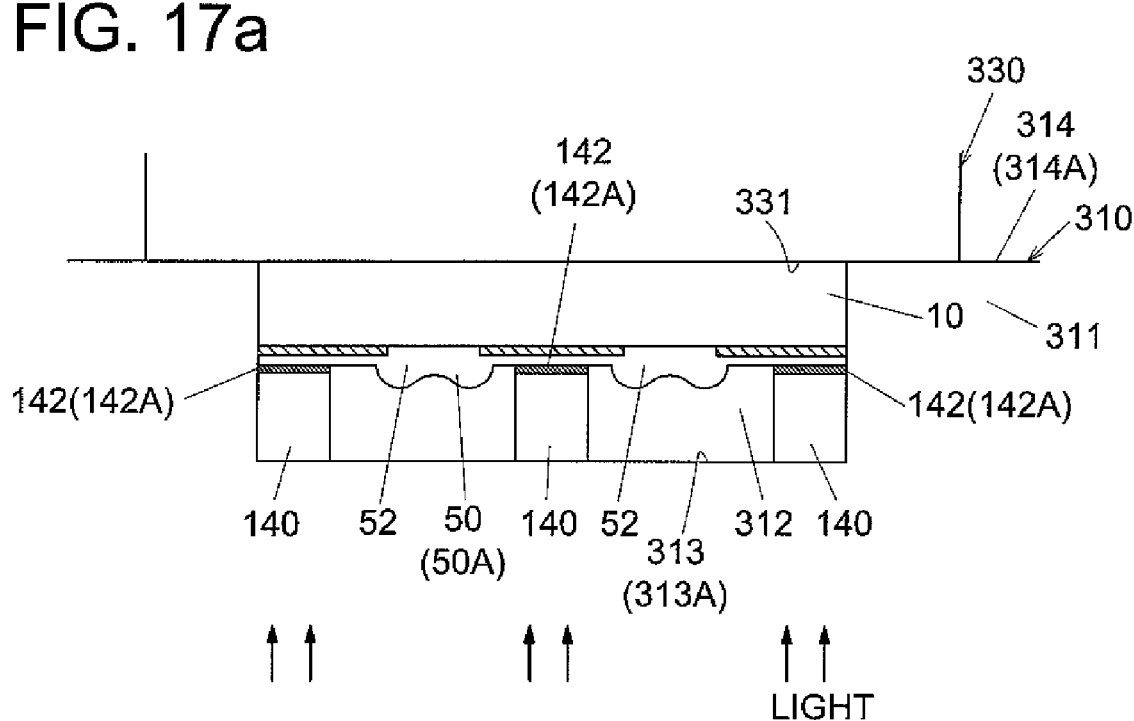
Figure 17B:
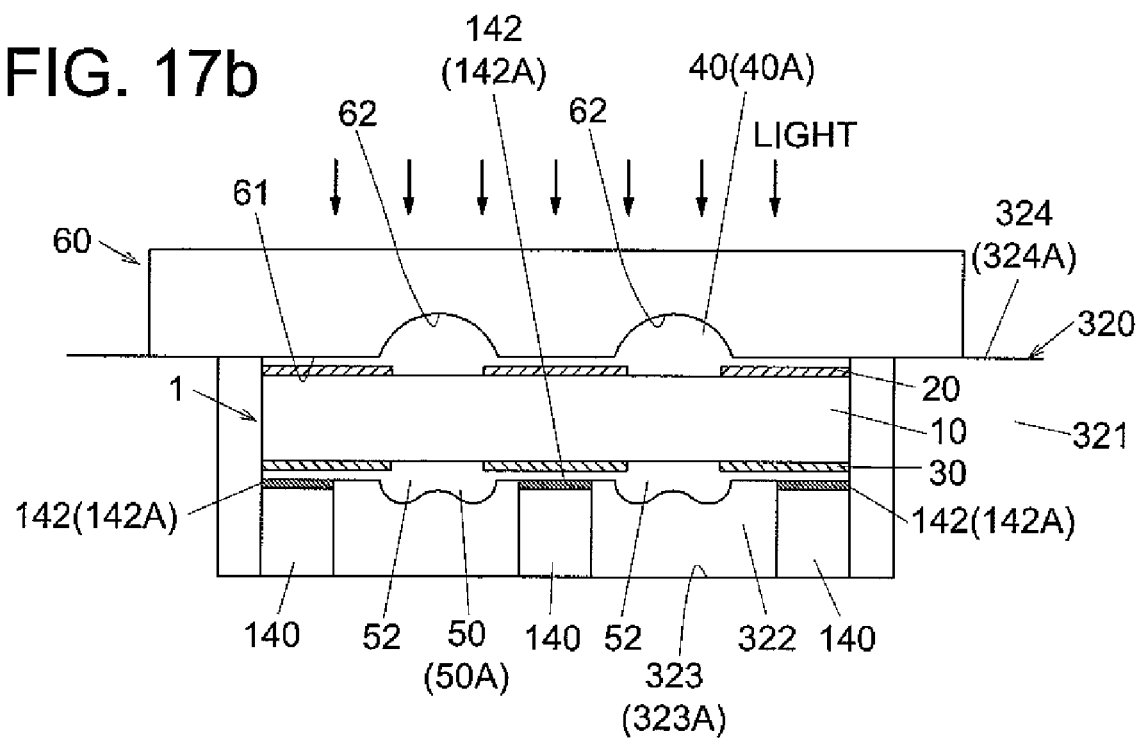

Each of FIGS. 17a and 17b is a diagram for illustrating modified examples of FIG. 13 and FIG. 15.

Figure 18:
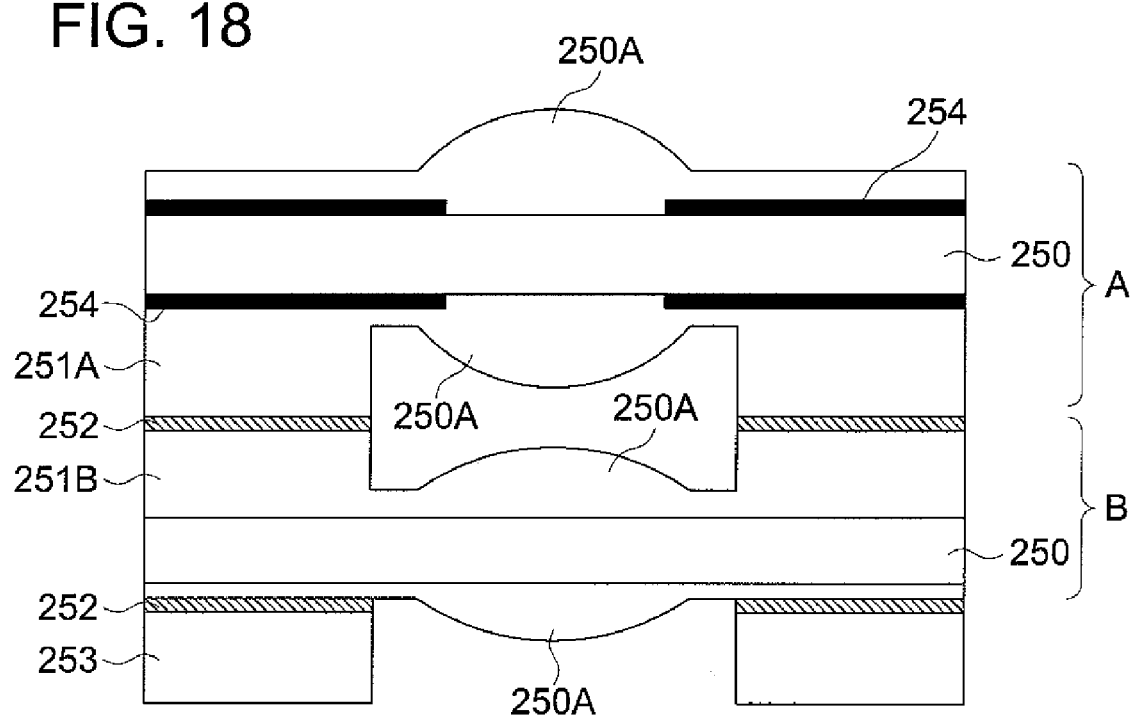

FIG. 18 is a diagram for schematically illustrating a method of producing a wafer lens assembly wherein a spacer section and a resin portion are unified in one body.

Figure 19:
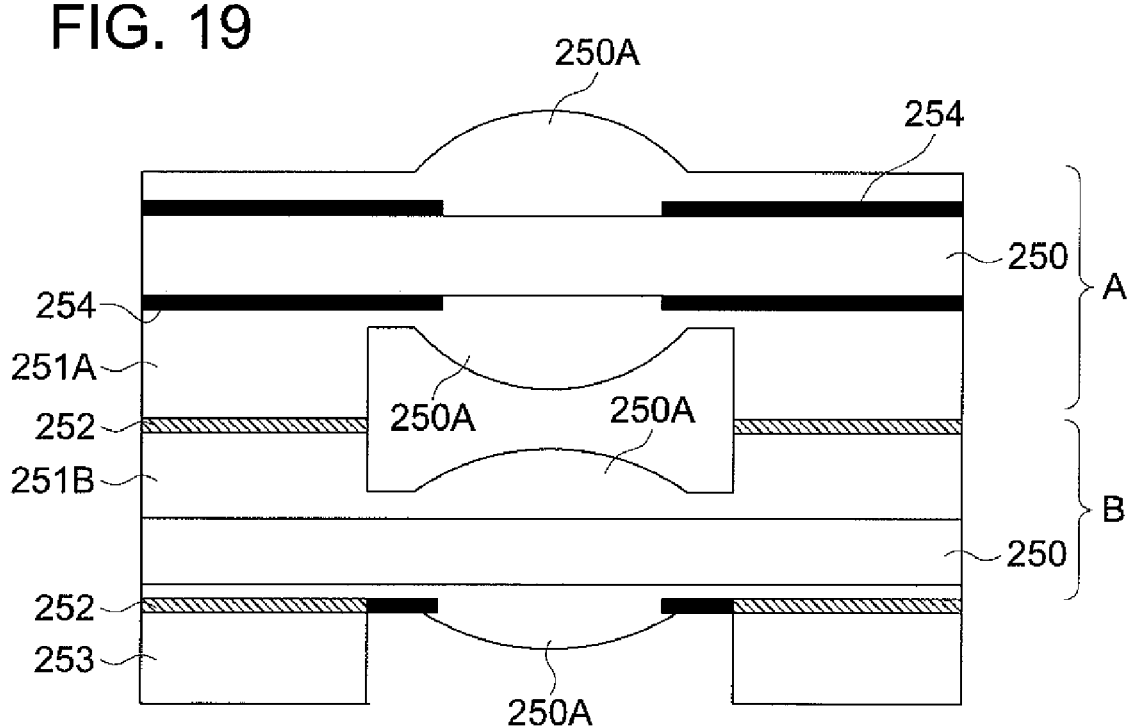

FIG. 19 is a diagram for illustrating a modified example of FIG. 18.

DESCRIPTION OF EMBODIMENTS

Preferable embodiments of the present invention will be explained as follows, referring to the drawings.

First Embodiment

Figure 1:
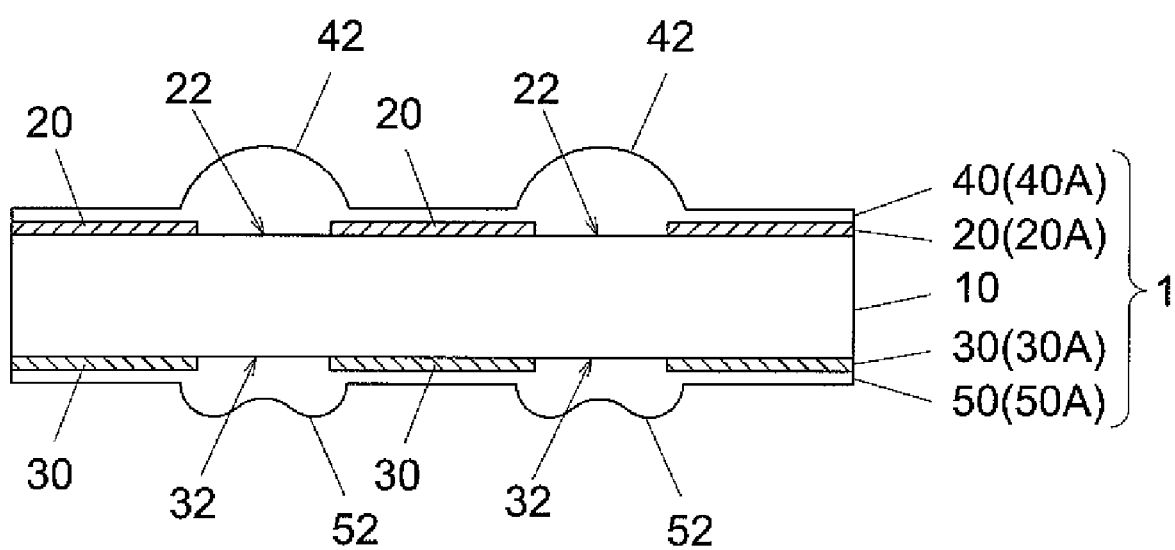
FIG. 1 is a schematic sectional view of a wafer lens relating to a preferred embodiment (first embodiment) of the present invention.

As shown in FIG. 1, wafer lens 1 is mainly composed of glass substrate 10, stops 20 and 30, and of resin portions 40 and 50. FIG. 1 is a sectional view taken on line I-I in FIG. 2. Glass substrate 10 is arranged at a central portion of wafer lens 1. Stop 20 and stop 30 are formed respectively on the top and the bottom of the glass substrate 10. On the upside of the glass substrate 10, there is formed resin portion 40, and the resin portion 40 covers openings of stop 20. On the downside of the glass substrate 10, there is formed resin portion 50, and the resin portion 50 covers openings of stop 30.

Figure 2:
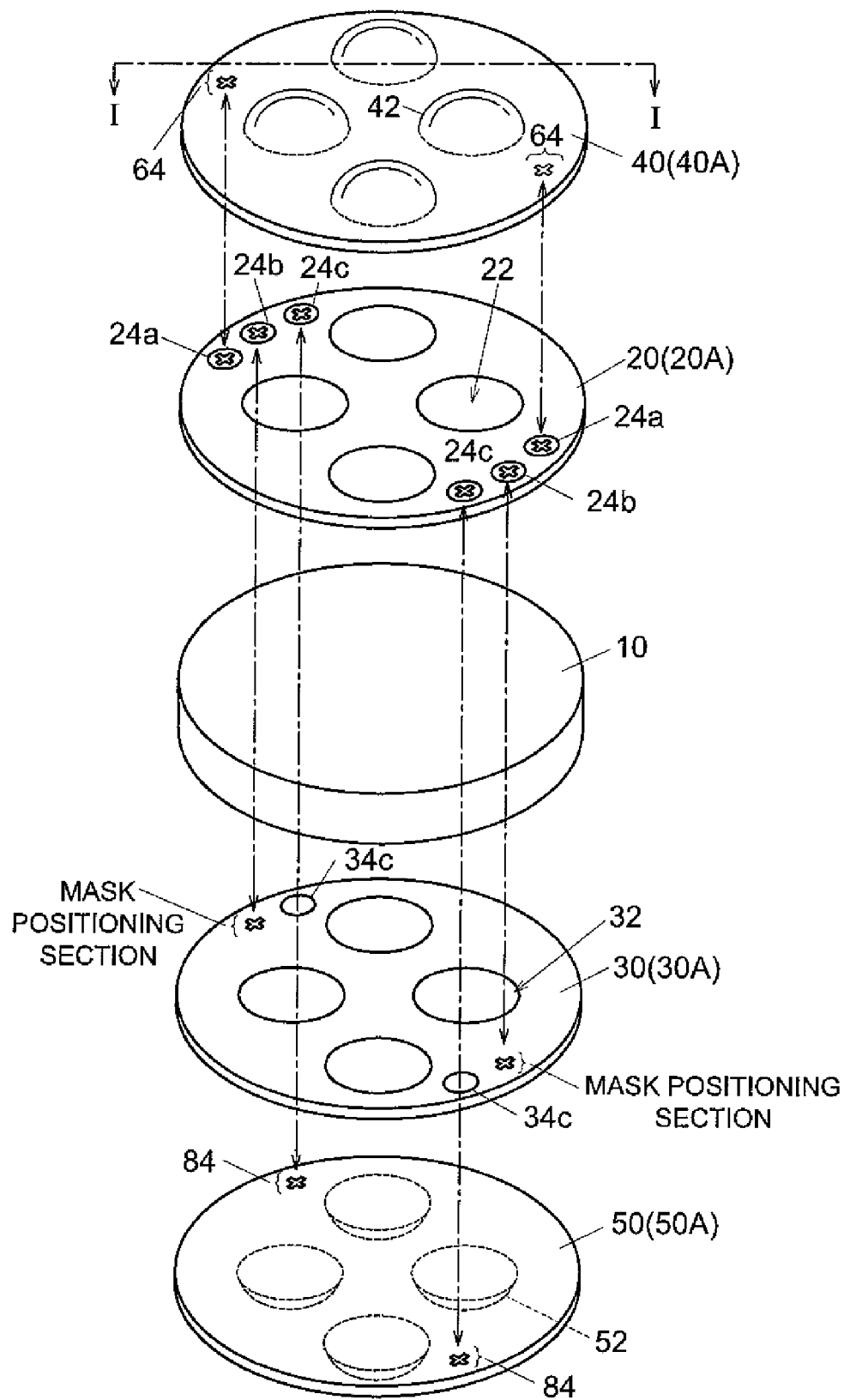
FIG. 2 is a schematic and exploded perspective view of a wafer lens relating to a preferred embodiment (first embodiment) of the present invention.

As shown in FIG. 2, glass substrate 10 is in a form of a disk with a predetermined thickness. Each of stop 20 and stop 30 is an element to adjust an amount of light for wafer lens 1. Stops 20 and 30 are composed of light-shielding metal films 20A and 30A, respectively, and formed on the upper surface and the lower surface of glass substrate 10, respectively.

Each of stops 20 and 30 may also be composed of a resist, silicone film or carbon film each of which has light blocking effect. Glass substrate 10 can be replaced with a transparent plastic substrate of a material such as thermosetting resin, photo-curable resin, and thermoplastic resin, or a transparent ceramic substrate. Any type of a substrate corresponding to glass substrate 10 can be used if it is made of an optically-transparent material.

On stop 20, there are formed a plurality of light transmitting sections 22 each being in a circular form. Each of the light transmitting sections 22 is a portion where no metal film 20A is formed to allow a transmission of light. On the peripheral portion of stop 20, there are formed three pairs of alignment marks 24a, 24b and 24c. The alignment marks 24a are arranged at positions on the line passing through the center of stop 20 to be symmetrical with respect to the center. Arrangements for the alignment marks 24b and 24c are also the same as that for the alignment marks 24a.

On stop 30, there are formed a plurality of light transmitting sections 32 each being in a circular form. Each of the light transmitting sections 32 is a portion where no metal film 30A is formed to allow a transmission of light. On the peripheral portion of stop 30, there are formed a pair of aperture sections 34c each being in a circular form. The aperture sections 34c are arranged at positions on the line passing through the center of stop 30 to be symmetrical with respect to the center.

Resin portions 40 and 50 are composed of transparent resins 40A and 50A, respectively. Each of resins 40A and 50A is photo-curable resin. In resin portion 40, there are formed a plurality of lens sections 42. Each of lens sections 42 is a portion that is convex toward the upper side, and its surface works as an optical surface. In resin portion 50, there are also formed a plurality of lens sections 52. Each of lens sections 52 is a portion that is convex toward the lower side, and its surface works as an optical surface.

In the wafer lens 1, lens section 42, light transmitting section 22, light transmitting section 32, and lens section 52 are arranged at positions corresponding to each other in the vertical direction, in this order from the upward in FIG. 2. When the aforesaid items are viewed vertically on a plane, their positions agree with each other. Alignment marks 24c of stop 20 and aperture section 34c of stop 30 are also arranged at corresponding positions in the vertical direction, and when they are viewed vertically on a plane, their positions agree with each other.

In succession, a method for producing wafer lens 1 will be explained.

As shown in FIG. 3a, stop 20 is formed on glass substrate 10 with a widely-known photo-etching technology. In a detailed way, metal film 20A is formed through a method such as evaporation coating or sputtering, on glass substrate 10, then, photo-resist is formed to coat the resulting substrate. After that, the resist is exposed and developed with a mask and an exposure device. As the aforesaid mask, there is used a mask having patterns capable of forming light transmitting sections 22 and alignment marks 24a, 24b and 24c for stop 20. After that, metal film 20A is etched through etching to form stop 20 including light transmitting sections 22 and alignment marks 24a, 24b and 24c.

Then, as shown in FIG. 3b, resin 40A in the state of monomer (before hardening) is placed on glass substrate 10, and then, master 60 is pressed down vertically to fill cavities 62 of the master 60 up with resin 40A.

As is shown in FIG. 4, master 60 is a mold that is constituted by being transferred from mother master 70 (mother mold), and it is composed of a transparent photo-curable resin. Mother master 70 is made of a material such as silicon, metal or quarts. On mother master 70, there are formed convex portions 72 each having the same shape as that of lens section 42 of resin portion 40, and positioning sections 74 corresponding to alignment marks 24a, 24b and 24c on stop 20. In the process of producing master 60, an area on mother master 70 is filled up with transparent photo-curable resin, and the transparent photo-curable resin is irradiated with light to be hardened. As a result, cavities 62 corresponding to convex portions 72 of mother master 70, and positioning sections 64 corresponding to positioning sections 74 of mother master 70, are formed on master 60, which is used as a mold for forming resin portion 40 in the present embodiment.

After that, as shown in FIG. 3b, cavities 62 of master 60 are irradiated with light from the upward with being filled up with resin 40A. Since master 60 is transparent as stated above, the light passes master 60, and enters and hardens resin 40A, which results in a formation of resin portion 40 (lens sections 42).

In particular, in the step of FIG. 3b, master 60 is pressed against glass substrate 10 and is irradiated with light, under the condition that positioning sections 64 of master 60 are positioned with respect to alignment marks 24a of stop 20.

In a detailed way, as shown in FIG. 5, microscope 90 that is movable only in the vertical direction, is focused on alignment marks 24a of stop 20 from the upward of glass substrate 10 (see (1) in FIG. 5). After that, microscope 90 is moved upward, and master 60 is arranged at a position between microscope 90 and glass substrate 10. Then, as the vertical position of the microscope 90 is adjusted, its focal position is set to positioning section 64 of the master 60 or to its vicinity (see (2) in FIG. 5).

In this case, assuming that alignment mark 24a on which the focal position is adjusted in advance and positioning section 64 on which the focal position is adjusted thereafter are in the state shown in the upper part in FIG. 6, for example, the master 60 is moved in the horizontal direction to the position where the positioning section 64 agrees with alignment mark 24a of stop 20 (see the lower part in FIG. 6). Under this state, master 60 is pressed against glass substrate 10 (see (3) in FIG. 5) and is irradiated with light.

After that, glass substrate 10 on which the resin portion 40 has been formed is removed from master 60 and is turned over, and stop 30 is formed on the other side of the glass substrate 10 as shown in FIG. 3c.

In this embodiment, stop 30 is formed on glass substrate 10 by using a widely-known lift-off technology. For details, photoresist is formed to coat (cover) glass substrate 10, then, the photoresist is exposed with a mask interposed between the photoresist and the exposure device, to form a resist image.

As the aforesaid mask, there is used a mask that has a pattern form capable of forming light transmitting sections 32 and aperture sections 34c for stop 30 and further has positioning sections that corresponds to alignment marks 24b of stop 20. As for the process of actual exposure, in the step of FIG. 3b, the photoresist is exposed with the positioning sections of the mask being adjusted to be agree with the corresponding alignment marks 24a, similarly to the process that the positioning sections 64 of master 60 is adjusted to agree with alignment marks 24a of stop 20.

After that, metal film 30A is formed on a position where the photoresist does not exist, with a sputtering device and a vacuum evaporation device, and photo-resist remaining finally is scraped off to form stop 30.

After that, as shown in FIG. 3d, resin 50A in the state of monomer (before hardening) is placed on glass substrate 10, and then, master 80 is pressed down vertically, and cavities 82 of the master 80 are filled up with resin 50A.

Master 80 is made in the same method as in that for master 60. Namely, master 80 is also a mold that is constituted being transferred from a mother master, and is composed of a transparent photo-curable resin. In the same way as in the master 60, there are formed also on the master 80, cavities 82 each having a shape corresponding to lens section 52 of resin portion 50, and positioning sections (84) corresponding to alignment marks 24c of stop 20. Master 80 is used as a mold of resin portion 50 in the present embodiment.

After that, cavities 82 of master 80 are irradiated with light from the upward with being filled up with resin 50A. Since the master 80 is transparent in the same way as in the master 60, the light passes master 80, and enters and hardens resin 50A, which results in a formation of resin portion 50 (lens sections 52).

In the same way as in the case where positioning sections 64 of master 60 are adjusted to agree with alignment marks 24a of stop 20 in the step of FIG. 3b, master 80 is pressed against glass substrate 10 and is irradiated with light also in the step of FIG. 3d, especially, under the condition that the positioning sections of master 80, which are not illustrated, are positioned with respect to alignment marks 24c of stop 20. As for the positioning of the positioning sections, which are not illustrated, with respect to alignment marks 24c, aperture sections 34c have been formed on stop 30 in the step of FIG. 3c, thereby, the visibility from microscope 90 is satisfactory secured, which prevents master 80 from being pressed against glass substrate 10 under the condition master 80 is displaced.

After that, glass substrate 10 on which resin portion 50 is formed is removed from master 80, thus, wafer lens 1 is produced.

In the present embodiment, three pairs of alignment marks 24a, 24b and 24c are formed on stop 20, and resin portion 40, stop 30 and resin portion 50 are positioned and formed on the basis respectively of the alignment marks 24a, 24b and 24c each serving as references. In a detailed way, with respect to alignment marks 24a, resin portion 40 (lens sections 42) is formed by utilizing positioning sections 64 of master 60. With respect to alignments mark 24b, stop 30 is formed by utilizing positioning sections of a mask for exposure. With respect to alignment mark 24c, resin portion 50 (lens section 52) is formed by utilizing positioning sections 84 of master 80 (see FIG. 2).

Therefore, it is possible to concentrate the references of the positioning onto stop 20, and to control the displacement of piled stops 20 and 30, resin portions 40 and 50 to each other along the horizontal direction within the minimum error range. It is further possible to adjust lens sections 42 of resin portion 40 and light transmitting sections 22 of stop 20, light transmitting sections 32 of stop 30, and lenses 52 of resin portion 50 to agree with each other along the optical axis with high accuracy.

Modified Example 1

An alignment mark may be formed at one position on glass substrate 10 without forming alignment marks 24a, 24b and 24c on stop 20, to be used as a reference for positioning of stops 20 and 30 and resin portions 40 and 50. Namely, stops 20 and 30 may be formed with a positioning section of a mask being adjusted to agree with the alignment mark, and resin portions 40 and 50 may be formed with positioning sections 64 and 84 of masters 60 and 80 being adjusted to agree with the alignment mark. In this example, aperture sections from which the alignment mark can be confirmed visually need to be formed on stops 20 and 30, and the alignment mark and positioning sections 64 and 84 of masters 60 and 80 are adjusted to agree with each other through the aperture sections.

Modified Example 2

Stops 20 and 30 may also be composed by prints (printing/drawing) in place of metal films 20A and 30A.

Each of stop 20 and 30 may be composed of a photo-resist containing light blocking substance such as carbon black, in place of metal films 20A and 30A. In other words, a stop with a predetermined pattern may be formed by applying photo-resist including carbon black onto one surface of the substrate, then, exposing and developing the photoresist. To give an example of the way to form stop 20, as shown in FIG. 7, photoresist 20B including carbon black is applied onto glass substrate 10 and the photoresist 20B is exposed and developed, then, the remaining photoresist 20B itself is used as stop 20. In this example, steps relating to metal films 20A and 20B (spattering, evaporation, and etching steps) can be eliminated and producing steps of wafer lens 1 can be simplified.

Second Embodiment

The Second Embodiment mainly differs from the First Embodiment in the following points, and the other points of the Second Embodiment are same as those in the First Embodiment.

As shown in FIG. 8, wafer lens 101 is layered on wafer lens 1 to construct wafer lens assembly 100. Spacer 140 is adhered on the downside of resin portion 50 of wafer lens 1 through adhesive layer 142. Spacer 140 is a member that is made of glass or transparent resin and is in a shape of a disk, and that includes aperture sections formed at positions corresponding to lens sections 52 of wafer lens 1 (that is, the lens sections 52 are exposed from the aperture sections). The adhesive layer 142 is made up of adhesive 142A whose material is a photo-curable resin.

There is also provided spacer 150 between wafer lens 1 and wafer lens 101 through adhesive layers 152 and 154. The spacer 150 is also a member that is made of glass or transparent resin and is in a shape of a disk, and that includes aperture sections formed at positions corresponding to lens sections 42 of wafer lens 1 and lens sections 52 of wafer lens 101 (Namely, lens sections 42 and 52 are exposed from the aperture sections). The adhesive layers 152 and 154 are made up of adhesive 152A and 154A whose material is a photo-curable resin, similarly to adhesive layer 142.

In wafer lens 101, stops 120 and 130 are employed in place of stops 20 and 30 of the wafer lens 1. The stops 120 and 130 are somewhat different from the stops 20 and 30 of the wafer lens 1 in terms of pattern forms. As is shown in FIG. 9, alignment marks 24a, 24b and 24c in FIG. 2 are not formed on stop 120, and stop 120 is composed of metal film 120A. As stop 130, metal films 130A are formed to surround light transmitting sections 32, and aperture sections 34c in FIG. 2 is not provided. In the present embodiment, spacer 150 (adhesive layer 154) is arranged to face a portion where stop 130 is not formed. Alternatively, stops 120 and 130 may be constructed by a resist, a silicone film or a carbon film each with light blocking effect.

Next, a method of producing wafer lens assembly 100 will be explained.

Wafer lens 1 is produced in accordance with the steps shown in FIGS. 3a through 3d, and spacer 140 is vertically arranged on the produced wafer lens 1. In a detailed way, adhesive 142A is applied onto an upper surface of resin portion 50 of wafer lens 1 or onto a lower surface of spacer 140 as shown in FIG. 10a, and the spacer 140 is placed on wafer lens 1. After that, adhesive 142A is irradiated with light from the upward of spacer 140 to be hardened, thus, spacer 140 is fixed on wafer lens 1.

After that, spacer 150 is fixed on resin portion 40 of wafer lens 1 as is shown in FIG. 10b in the same way as that for fixing spacer 140 (where, an item manufactured by this process is called "precursor 160A").

Separately from the steps shown in FIGS. 10a and 10b, a part of wafer lens 101 is produced. In a detailed way, metal films 130A are formed on glass substrate 10 with a widely-known photo-etching technology or a lift-off technology as shown in FIG. 11a, and thereby stops 130 are formed. This example employs a mask having a pattern form capable of forming stops 130.

After that, as shown in FIG. 11b, cavities 82 of master 80 are irradiated with light with being filled up with resin 50A, in the same way as that for forming resin portion 50 (lens sections 52) of wafer lens 1, to form resin portion 50 (where, an item produced by this process is called "precursor 160B").

After that, as is shown in FIG. 12a, adhesive 154A is applied onto the upper surface of spacer 150 of precursor 160A or onto the lower surface of resin portion 50 of precursor 160B, and the precursor 160B is placed on the precursor 160A. After that, adhesive 154A is irradiated with light from the upward of glass substrate 10 of the precursor 160B to be hardened, thus, the spacer 150 is fixed between precursor 160A and precursor 160B.

After that, as shown in FIG. 12b, a metal film is formed on glass substrate 10 of precursor 160B with a widely-known photo-etching technology or a lift-off technology, and thereby stop 120 is formed. In this case, a mask having a positioning section at a position corresponding to any one of alignment marks 24a, 24b and 24c of stop 20 of the precursor 160A is preferably used as a mask, to prevent displacement of stop 120 from stop 20 in the horizontal direction.

Meanwhile, in the steps shown in FIGS. 12a and 12b, stop 120 is not formed at the beginning on the upper surface of glass substrate 10 (the surface on which an optical surface is not formed) of precursor 160B, and stop 120 is formed after precursor 160B and precursor 160A are adhered together with adhesive 154A. Alternatively, stop 120 may be formed as follows. At the beginning, before precursor 160B and precursor 160A are adhered together, there is previously formed, on glass substrate 10 of precursor 160B, a pattern of the stop through which light can enters to a portion which is on the upper surface of glass substrate 10 of precursor 160B and is to be adhered (faces) to spacer 150. Then, the resulting precursor 160B is adhered to precursor 160A as it is.

After that, cavities 62 of master 60 are irradiated with light with being filled up with resin 40A, to form resin portion 40, as shown in FIG. 12c, in the same way as that for forming resin portion 40 (lens sections 42) of wafer lens 1. In this case, it is preferable that an aperture section is previously formed at a position which is on stop 120 and corresponds to alignment mark 24a of precursor 160A in the step shown in FIG. 12b, then positioning section 64 of master 60 is adjusted to agree with alignment mark 24a through the aperture section. It prevents displacement of resin portion 40 on precursor 160B from stop 20 in the horizontal direction.

After that, glass substrate 10 on which resin portion 40 is formed is separated from master 60, and wafer lens assembly 100 is produced.

In the present embodiment, stop 130 is not formed at a position to face spacer 150, in the step of producing precursor 160B (see FIGS. 11a and 11b). Therefore, when the precursor 160A and the precursor 160B are adhered together, light for hardening adhesive 154A enters straight adhesive 154A through glass substrate 10 of precursor 160B (see FIG. 12a), which allows surely hardening of adhesive 154A. Incidentally, in the aforesaid embodiment, there has been described about precursor 160A by using an example that spacers 140 and 150 provided as separated bodies are joined to a glass substrate. Alternatively, as shown in FIG. 18, precursor 160A can have a structure that there is prepared structure A in which resin portion 250A which forms lens sections on a glass substrate forms spacer section 251A for defining a distance to the other substrate as one body, and that the structure A is joined to the other substrate. Similarly, structure A may be joined to structure B in which resin portion 250A forms spacer section 251B as one body.

In this case, adhesive 252 is applied on at least one of joining areas on spacer sections 251A and 251B formed respectively on structures A and B, and then, adhesive 252 is hardened by light irradiation after the structures A and B are joined together.

In this case, there can be provided an arrangement that stop 254 is formed only on opposing surfaces of a substrate of structure A, as shown in FIG. 18, in order that stop 254 does not prevent irradiation of light for an adhesive to be hardened, then, the adhesive is irradiated with light from the downward of structure B.

Alternatively, there can be provided an arrangement that resin portion 250A corresponding to a lens section is formed on the bottom side of structure B, or spacer 253 provided as a separated body is joined with the bottom side of the structure B through adhesive, after the structure B is joined to the structure A.

In this case, a stop may be formed in advance on a portion where the adhesive is not applied, on the bottom surface of the glass substrate to be joined to spacer 253 as shown in FIG. 19.

Modified Example 1

Each of spacers 140 and 150 may be formed of ground glass, and surface roughness Ra on the side wall of a hole portion (aperture portion corresponding to each of lens sections 42 and 52) is made preferably to be 0.1 μm or more. Since the spacer is generally made of glass, it is adhered on the surface of the substrate representing a glass plate with an adhesive made of photo-curable resin. However, glass generally reflects irradiation light. Especially under a condition of a large incident angle, an amount of light which can enter from the air to glass is reduced fractionally, and a sufficient amount of light does not enter the adhesive when the adhesive is irradiated. It causes a problem of uncertain adhesion.

However, the aforesaid arrangement exhibits the following merits. To give an example of hardening adhesive 142A, even when light enters from diagonally above spacer 140 as shown in FIG. 10a, the light enters spacer 140 and is scattered without causing total reflection on the side wall of spacer 140. The scattered light travels in spacer 140 and reaches adhesive 142A. Therefore, it can accelerate the hardening of adhesive 142A. As a result, spacer 140 and one wafer lens are surely adhered, which allows to pile the other wafer lens thereon.

In particular, the incident direction of light for hardening adhesive is usually set in the optical axis direction of the optical surface that is molded not to be placed in shade of a stop. However, the incident light has a very shallow angle to the side wall of an aperture for optical path formed on the spacer (that is, the incident angle is large), thereby, a most amount of incident light is reflected on the side wall with a small surface roughness. From the viewpoint of light scattering, because Rayleigh scattering is caused when obstacles in size of wavelength exist, it can be expected that incident light enters into the spacer because of a scattering effect by providing a surface roughness with such the size to the side wall of the spacer. Generally, an average roughness size (such as Rz and Rty) of the surface roughness has a value three or four times as large as the average surface roughness Ra. Therefore, when the values of Rz and Rty which represent a size of scatters is of the same order of magnitude as wavelength, the preferable value of Ra is about 0.1 μm or more for exhibiting the scattering effect. The upper limit of the value is about 1 μm, because an excessively large value of Ra makes the undesirable condition that the side-wall surface fully friable and the side-wall surface is easily broken.

Modified Example 2

When precursor 160A and precursor 160B are adhered together, stop 130 of wafer lens 101 and resin portion 50 are not positioned with accuracy, which can cause a slight displacement between lens portions 42 and 52 of wafer lens 1 and lens portions 52 of wafer lens 101. Therefore, the optical accuracy of lens section 52 of resin portion 50 may be deteriorated to some extent. Alternatively, glass substrate 10 of precursor 160B can be directly adhered to precursor 160A without forming stop 130 and resin portion 50 thereon.

Modified Example 3

When adhesive made of a resin which is curable with both of light and heat is employed in place of adhesives 142A, 152A and 154A, and when hardening them, the adhesive can be fully hardened by heating after being halfway hardened by light irradiation.

Modified Example 4

Wafer lens assembly 100 is separated into pieces each including lens portions 42 and 52 to be used for an optical system of an image pickup device. The thickness becomes large because a unit of wafer lens is formed by layering wafer lens 1 and spacers 140 and 150. Therefore, stops 20, 30, and 120 may be formed on a place excluding cutting portion C which is positioned between the lens sections 42 and 52 (See FIG. 12c) in order that cutting process can be carried out easily.

Third Embodiment

In the third embodiment, resin portion 50 is formed by using first jig 210 as shown in FIG. 13, in the step shown in FIG. 3d of the first embodiment. Further, spacer 140 is adhered by using pressing member 230 and second jig 220, as shown in FIG. 15, in the step shown in FIG. 10a. The other steps are the same as those in the first embodiment. Originally, when optical members are formed on both sides of a glass plate, it is required as specifications for providing highly accurate wafer lenses that each of the two optical members arranged on the upper side and the lower side is uniform in axial thickness. However, in the conventional art, the axial thickness has been regulated with an amount and viscosity of curable resin provided as a molding material for the optical members and with moving distance of a mold toward the glass plate. Therefore, change in storage temperature and molding temperature, or measurement error of the volume of resin directly affects the axial thickness, which has made the enhancement of accuracy of the wafer lens difficult.

The present embodiment is achieved in view of the aforesaid circumstances, and one of its objects is to provide a producing method of wafer lens which is capable of making each of axial thickness of optical members provided on the both sides to be uniform and capable of producing a highly accurate wafer lens, and to provide a producing method of wafer lens assembly formed by layering the plurality of wafer lenses.

An embodiment for the aforesaid object is a method of producing a wafer lens in which a first optical member made of a curable resin is formed on one surface of a substrate, and a second optical member made of a curable resin is formed on the other surface of the substrate. In the method, the first optical member is previously formed on the one surface of the substrate using a first master mold including a molding surface for the first optical member. In the method, there is employed a first jig including a first contact surface which comes in contact with a surface at the side of the first optical member in the substrate and a second contact surface which comes in contact with a pressing surface which is located on a second master mold with a molding surface for the second optical element and presses the other surface of the substrate. In the method, the surface at the side of the first optical member is placed to come in contact with the first contact surface, and a space between the other surface of the substrate and a molding surface of the second master mold is filled up with the curable resin. Then, in the method, the pressing surface is placed to come in contact with the second contact surface to form the second optical member.

Another embodiment is a method for producing a wafer lens assembly by vertically layering the wafer lenses produced by the producing method of the wafer lens of the above embodiment, through a spacer. In the method, one surface of the spacer is placed on a surface at the side of the second optical member in one of the wafer lenses. In the method, there are provided a pressing member pressing the other surface of the spacer, and a second jig including a third contact surface which comes in contact with a surface at the side of the first optical member in the one of the wafer lenses, and a fourth contact surface which comes in contact with a pressing surface which is provided in the pressing member for pressing the other surface of the spacer. By using the pressing member and the second jig, the surface at the side of the first optical member in the one of the wafer lenses is placed to come in contact with the third contact surface. In the method, an adhesive made of a photo-curable resin is applied on an area between the surface at the side of the second optical member in the one of the wafer lenses and one surface of the spacer, and the adhesive is irradiated with light after the other surface of the spacer is pressed by the pressing member so that the pressing surface is placed to come in contact with the fourth contact surface. Then, the spacer is adhered to the wafer lens.

As shown in FIG. 13, the first jig 210 includes base 211. On the upper surface of base 211, there is formed recessed portion 212 on which wafer lens 1 is placed. A central portion of the recessed portion 212 is vertically opened so that wafer lens 1 may be placed on bottom surface 213 which forms the recessed portion 212. The bottom surface 213 serves first contact surface 213A for coming in contact with the outer circumferential edge of the lower surface of resin portion 40. The upper surface 214 of base 211 serves second contact surface 214A for coming in contact with pressing surface 81 in master 80 for pressing resin 50A used for filling an area above the glass substrate 10.

First, the outer circumferential edge in the lower surface of resin portion 40 is placed to come in contact with the first contact surface 213A, by using such the first jig 210. Then, resin 50A in the state of a monomer is placed on glass substrate 10, and master 80 is moved down from the upward, and pressing surface 81 of master 80 is placed to come in contact with the second contact surface 214A. Under the condition, cavities 82 of master 80 is filled up with resin 50A.

After that, resin 50A is hardened by light irradiation conducted in the same way as that in the first embodiment, and thereby, resin portion 50 (lens sections 52) is formed.

Incidentally, the first jig 210 may also have the structure wherein jig section 215a is installed on the upper surface of base 211a, as shown in FIG. 14. In this case, an upper surface of base 211a serves first contact surface 213Aa, and an upper surface of the jig section 215a serves second contact surface 214Aa. In the structure where the first jig 210a is separately provided as base 211a and jig section 215a, it is possible to adjust a height in the optical axis direction of resin portion 50 easily, by changing only a height of jig section 215a properly.

Next, as is shown in FIG. 15, pressing member 230 and second jig 220 are used, and spacer 140 is placed on wafer lens 1 produced in the aforesaid way first.

The pressing member 230 is provided to press an upper surface of the spacer 140 that is placed on the upper surface of resin portion 50 of wafer lens 1. Pressing surface 231 of the pressing member 230 is formed in a horizontal plane.

Though the second jig 220 is the same in terms of a shape as the first jig 210 basically, when it is compared with the first jig 210, a height between the third contact surface 223A and the fourth contact surface 224A is higher by almost an amount equivalent to a height of spacer 140. In a concrete way, the second jig 220 has base 221 on which recessed portion 222 is formed. Bottom surface 223 forming the recessed portion 222 serves third contact surface 223A for coming in contact with the outer circumferential edge of the lower surface of resin portion 40. Further, upper surface 224 of base 221 serves fourth contact surface 224A for coming in contact with pressing surface 231 of pressing member 230.

By using such the second jig 220, the outer circumferential edge of the lower surface of resin portion 40 is placed to come in contact with the third contact surface 223A first. Then, adhesive 142A is applied on the upper surface of resin portion 50 or on the lower surface of spacer 140 in advance, and spacer 140 is placed thereon. After that, pressing member 230 is moved downward to place pressing surface 231 of the pressing portion 230 to come in contact with the fourth contact surface 224A. Owing to this, the spacer 140 is pressed against resin portion 50.

After that, adhesive 142A is irradiated with light from the upward of the spacer 140 to be hardened, so that the spacer 140 is adhered to wafer lens 1.

Alternatively, the second jig 220 may also has the structure wherein two jig sections 226a and 227a are equipped in this order on the upper surface of base 221a as shown in FIG. 16. In this case, the upper surface of the base 221a serves third contact surface 223Aa, and the upper surface of jig section 227a serves fourth contact surface 224Aa.

When the second jig 220a is separately provided as base 221a and two jig sections 226a and 227a, it is possible to adjust a vertical position of the spacer 140 easily by changing only a height of jig section 227a properly.

In the present embodiment stated above, first contact surface 213A of first jig 210 is provided as a reference surface, and the lower surface of resin 40 is placed to come in contact with first contact surface 213A. Under such the state, resin 50A placed between cavities 82 of master 80 and the upper surface of glass substrate 10 is pressed by placing the pressing surface 81 of master 80 to come in contact with second contact surface 214A. Therefore, even when thicknesses of substrates are uneven, a distance between first contact surface 213A and second contact surface 214A is kept to be constant. As a result, there can be obtained wafer lenses 1 with high accuracy in which axial thickness M (see FIG. 8) of two lens sections 42 and 52 is uniform.

After wafer lens 1 is produced, third contact surface 223A of second jig 220 is provided as a reference surface, and the lower surface of resin portion 40 is placed to come in contact with third contact surface 223A. Under the state, adhesive 142A positioned between the lower surface of spacer 140 and the upper surface of resin portion 50 is pressed by placing pressing surface 231 of pressing member 230 to come in contact with fourth contact surface 224A. Thereby, a distance between third contact surface 223A and fourth contact surface 224A can be kept to be constant. As a result, an interval of surfaces between lens section 52 of the wafer lens 1 and lens section 42 at the lower surface of the other wafer lens 101 to be piled on the wafer lens 1 (in the example of FIG. 8, surface interval N between lens section 42 of wafer lens 1 and lens section 52 of wafer lens 101), becomes constant.

Modified Example

In the modified example, resin portion 50 is formed on the lower surface of glass substrate 10, spacer 140 is adhered thereon with pressing member 330 and third jig 310, as shown in FIG. 17a. After that, resin portion 40 is formed on the upper surface of the glass substrate 10 by the use of fourth jig 320 as is shown in FIG. 17b.

Incidentally, in the steps of FIGS. 17a and 17b, stop 20 is not formed on the upper surface of glass substrate 10 (a surface where optical surface are not formed) at the beginning, and stop 20 is formed after spacer 140 is adhered to glass substrate 10. Alternatively, stop 20 may be previously formed on the upper surface of glass plate 10 from the beginning, before spacer 140 is adhered, then spacer 140 may be adhered to the glass substrate.

Third jig 310 includes base 311. On the upper surface of base 311, there is formed recessed portion 312 where the spacer 140 is placed. Bottom surface 313 forming the recessed portion 312 serves fifth contact surface 313A for coming in contact with the lower surface of the spacer 140. Further, upper surface 314 of base 311 serves sixth contact surface 314A for coming in contact with pressing surface 331 of pressing member 330.

By using such the pressing member 330 and third jig 310, spacer 140 is placed at a predetermined position with the lower surface coming in contact with fifth contact surface 313A. At that time, adhesive 142A is applied on the upper surface of spacer 140 or the lower surface of resin portion 50. Then, under the condition that the whole surface of the upper surface of glass substrate 10 is stuck to the pressing member 330, the pressing member 330 is moved downward and pressing surface 331 of pressing member 330 is placed to come in contact with sixth contact surface 314A. Thereby, the upper surface of spacer 140 is pressed with the lower surface of resin section 50.

After that, adhesive 142A is irradiated with light from downward of spacer 140 to be hardened, and spacer 140 is adhered to resin portion 50.

Next, resin portion 40 is formed by using fourth jig 320, on the upper surface of glass substrate 10 on which the spacer 140 has been adhered in the aforesaid manner.

Fourth jig 320 is basically the same as third jig 310 in terms of a shape. However, a height of the fourth jig 320 between the seventh contact surface 323A and the eighth contact surface 324A is higher than the third jig 310, by an amount that is almost the same as a thickness of stop 20. Specifically, the fourth jig 320 includes base 321 on which recessed portion 322 is formed. Bottom surface 323 forming the recessed portion 322 serves seventh contact surface 323A for coming in contact with the lower surface of spacer 140. Further, upper surface 324 of base 321 serves eighth contact surface 324A for coming in contact with pressing surface 61 of master 60.

By using such the fourth jig 320, the lower surface of the spacer 140 is placed to come in contact with seventh contact surface 323A first. Then, resin 40A in the state of monomer is placed on glass substrate 10 in advance, and master 60 is moved down from the upward, so that pressing surface 61 of master 60 is placed to come in contact with eighth contact surface 324A. Under the state, cavities 62 of master 360 are filled up with resin 40A.

After that, light irradiation is conducted in the same way as that in the first embodiment, to harden resin 40A, and thereby, resin portion 40 (lens sections 42) is formed.

In the aforesaid embodiment stated above, fifth contact surface 313A of third jig 310 is provided as a reference surface, and the lower surface of spacer 140 is placed to come in contact with fifth contact surface 313A. Under the state, adhesive 142A positioned between the upper surface of spacer 140 and the lower surface of resin portion 50 is pressed by placing pressing surface 331 of pressing member 330 to come in contact with sixth contact surface 314A. Thereby, a distance between fifth contact surface 313A and sixth contact surface 314A can be kept to be constant. As a result, an interval of surfaces between lens section 52 of the wafer lens 1 and lens section 42 at the lower surface of the other wafer lens 101 to be piled on the wafer lens 1 (in the example of FIG. 8, surface interval N between lens section 42 of wafer lens 1 and lens section 52 of wafer lens 101), becomes constant.

After the spacer 140 is adhered, seventh contact surface 323A of fourth jig 320 is provided as a reference surface, and the lower surface of spacer 140 is placed to come in contact with seventh contact surface 323A. Under the state, resin 40A positioned between cavities 62 of master 60 and the upper surface of glass substrate 10 is pressed by placing pressing surface 61 of master 50 to come in contact with eighth contact surface 324A. Thereby, a distance between seventh contact surface 323A and eighth contact surface 312A can be kept to be constant, even if thickness of substrate is uneven. As a result, wafer lenses 1 with high accuracy in which axial thickness M (see FIG. 8) of two lens sections 42 and 52 is uniform, can be obtained.

REFERENCE SIGNS LIST

1 Wafer lens
10 Glass substrate
20 Stop (First stop)
   20A Metal film
   22 Light transmitting section
   24a, 24b, 24c Alignment marks
30 Stop (Second stop)
   30A Metal film
   32 Light transmitting section
   34c Aperture section
40 Resin portion (First optical member)
   40A Resin
   42 Lens section
50 Resin portion (Second optical member)
   50A Resin
   52 Lens section
60 Master (First master mold)
   62 Cavity
   64 Positioning section
70 Mother master (Mother mold)
   72 Convex portion
   74 Positioning section
80 Master (Second master mold)
   81 Pressing surface
   82 Cavity
   84 Positioning section
100 Wafer lens assembly
101 Wafer lens
120 Stop
130 Stop
   134 Aperture section
140 Spacer
142 Adhesive layer
142A Adhesive
150 Spacer
   152, 154 Adhesive layers
   152A, 154A Adhesive
160A, 160B Precursors
210 First jig
   213A First contact surface
   214A Second contact surface
220 Second jig
   223A Third contact surface
   224A Fourth contact surface
230 Pressing member
   231 Pressing surface

The invention claimed is:

1. A method for producing a wafer lens which includes:
a substrate which is transparent and includes a front surface and a back surface;
an alignment mark formed on one surface of the front surface and the back surface of the substrate;
a first stop member including a plurality of light transmitting sections, arranged on the other surface of the front and back surface of the substrate;

a plurality of first lens sections formed of a curable resin, on the one surface of the substrate;

and a plurality second lens sections formed of a curable resin, on the other surface of the substrate, the method comprising:

an alignment mark forming step of forming the alignment mark on the substrate;

a first lens section forming step of forming the first lens sections by molding a curable resin arranged at an area between the substrate and a first mold for molding the first lens sections, under a condition that the first mold is positioned with respect to the alignment mark;

a first stop member forming step of forming the first stop member on the substrate; and a second lens section forming step of forming the second lens sections by molding a curable resin arranged at an area between the substrate where the first stop member is formed and a second mold for molding the second lens sections, under a condition that the second mold is positioned with respect to the alignment mark, wherein the first stop member is formed so as not to prevent positioning of the second mold with respect to the alignment mark.

2. The method for producing a wafer lens of claim 1, wherein a second stop member including a plurality of light transmitting sections is formed on a surface with the alignment mark in the substrate, and the alignment mark and the second stop member are formed at the same time.

3. The method for producing a wafer lens of claim 1, wherein the first stop member includes an aperture section formed so as not to prevent positioning of the second mold with respect to the alignment mark.

4. A wafer lens comprising:

a transparent substrate including a front surface and a back surface;

an alignment mark formed on one surface of the front and the back surfaces;

a first stop member including a plurality of light transmitting sections, formed on the other surface of the front and back surfaces;

a plurality of first lens sections formed of a curable resin, arranged on the one surface of the substrate; and a plurality of second lens sections formed of a curable resin, arranged on the other surface of the substrate, wherein the first stop member is formed such that the alignment mark is visible from a side of a surface without the alignment mark in the substrate.

5. The wafer lens of claim 4, wherein the first stop member includes an aperture section, formed such that the alignment mark is visible through the aperture section.

* * * * *